United States Patent [19]

Atencio

[11] 4,261,171
[45] Apr. 14, 1981

[54] FUNCTIONALLY TRANSFORMABLE DAM WITH TIDAL POWER STATION

[76] Inventor: Francisco J. G. Atencio, 3101 Diamante, Entre Rios, Argentina

[21] Appl. No.: 952,977

[22] Filed: Oct. 20, 1978

[51] Int. Cl.³ .......................... E02B 9/08; F03B 13/08
[52] U.S. Cl. ...................................... 60/398; 290/53; 405/76; 415/500
[58] Field of Search ...................... 60/398; 290/42, 43, 290/52, 53, 54; 405/75, 76, 78, 87, 90, 98; 415/129, 500; 417/334

[56] References Cited

U.S. PATENT DOCUMENTS

| | | | |
|---|---|---|---|
| 2,962,599 | 11/1960 | Pirkey | 415/500 X |
| 3,226,083 | 12/1965 | Braikevitch | 415/500 X |
| 4,073,146 | 2/1978 | Atencio | 405/78 |
| 4,078,388 | 3/1978 | Atencio | 405/78 |
| 4,143,990 | 3/1979 | Atencio | 290/53 X |
| 4,159,188 | 6/1979 | Atencio | 290/53 |

Primary Examiner—Irwin C. Cohen

[57] ABSTRACT

A functionally transformable tidal station associated with a dam having a plurality of fluid flow passageways being alternatively functionally transformable, either into a sluicing mode procedure or into a motorizing fluidic conveying procedure following either the emptying of the dam basin or the reversed filling of same. One or more rotatable and linearly displaceable hydromotive assemblies are provided, each in functional combination with one or a pair of diffusers mounted for rectilinear displacement at each side of the dam so as to act in a generation mode during an ebb tidal cycle and alternatively, during a flood tidal cycle. When acting as a sluiceway, both the hydromotive assembly and the diffusers are displaceable away from said fluid flow passageway so as to permit free passage of flowing waters therethrough.

12 Claims, 6 Drawing Figures

FUNCTIONALLY TRANSFORMABLE DAM WITH TIDAL POWER STATION

The present invention relates generally to dams having functionally transformable tidal stations adapted to be located in coastal sites for the purpose of energy generation. More particularly, the generating tidal stations are constructed to operate in an energy generation mode, either along a direct or ebb tidal cycle during the emptying of the dam basin or alternatively, along a reversed or flood tidal cycle during the filling of the basin from the sea.

By the present arrangement means are provided to displace the generating assembly away from the dam fluid flow passageway after either the direct or reversed generating cycle so as to transform the passageway into a sluiceway conduit to aid in either filling of the basin after the flood generation cycle is finished, or in emptying this same basin after the ebb generation cycle is finished.

Until this date, tidal powered hydroelectric installations have not been fully developed despite the potential available along coastal sites located in Canada (Fundy Bay, Ungava Bay etc.), Great Britain (Severn project, Solway Firth etc.), France (Chausey Islands project), Australia (Secure Bay, Walcott Inlet etc.), Alaska (Cook Inlet) and the like. Thus the opportunity exists to provide an improved arrangement designed to overcome the economic barriers of the past which have to date, precluded the development of satisfactory tidal generation systems.

Accordingly, one of the objects of the present invention is to provide an improved functional tidal dam with tidal stations adaptable to a single basin tidal environment and including a single energy generation assembly operable in dual-cycle modes, that is, during both ebb and flood cycles.

Considering the above it will be understood that electric power will be produced during both the ebb tidal cycle when the dam basin is emptying and also during the flood tidal cycle when the basin is filling. The foregoing is achieved by using hydromotive assemblies preferably having fixed-bladed runners thereby avoiding the more costly hydromotive sets having Kaplan-type turbine runners with movable blades. More economical tidal power generation would be greatly enhanced in this manner.

A shortcoming of existing tidal projects involves the very low energetic efficiency realized during the reversed, flood type tidal cycle which minimizes the advantages of producing electric power during both alternate direct ebb tidal and reversed flood tidal cycles. The present invention, instead, permits efficiencies in the order of 80% or more thereby dramatically improving existing developments.

Another object of the present invention is to provide an improved functionally transformable dam with tidal station having the potential for energy generation of satisfactory efficiency when operating during both ebb and flood tidal cycles.

Until this time, most tidal projects have been developed around the single-basin, single-operation tidal cycle which produces only 22% of the available energy realizable from the tides. By planning a dual-operation tidal cycle generation station around a single basin, then a solid 34% of the available energy realizable from the tides, can be obtained.

A further object of the present invention is to provide functionally transformable dam with tidal station having displaceable components operable to realize at least 34% of the available energy from the combined ebb and flood tides.

Because of the previously mentioned fixed-bladed propellers, greater diameter runners are possible with the result that more powerful machines can be realized. These runners can be constructed up to 9 meters or more in diameter for tidal stations and powered outputs per machine can be expected to be well above 60,000 kW. per machine. In this manner the power concentration factor which defines the Kilowatt output per linear meter of damming structure, is improved from past levels of 1,500 kW/meter, up to more than 2,000 kW/meter.

An advantage of the present invention is attached to the economics relative both the maintenance and replacement features of the hydromotive machines. An entire machine may be readily replaced while necessary maintenance is performed on removed machines at a remote service center.

A further object of the present invention is to provide a functionally transformable dam with tidal station including a dam body having a water passageway serving not only the turbine of a hydromotive machine but serving also as a sluiceway when the hydromotive machine is shifted along guide means away from the water passageway.

The above feature permits the elmination of costly sluicing structures which until now have comprised independent arrangements and also avoids costly mechanical equipment such as gates, cranage means, and the like.

It is acknowledged that idle-operated turbines can be designed also to be actuated as sluicing means, by throttling the hydraulic head and consequently increasing back pressure on the downstream face of each turbine runner. This can be accomplished by means of a gate actuated to restrict the water passage downstream of the turbine runner, in the draft tube conduit. This would allow the passage of a flow of about 50% of the flow allowed at full energetic load of the involved hydromotive machine, and at the added cost introduced by the necessary gated arrangement.

With the present arrangement, it is possible to reach a 150% discharge capacity by displacing the turbine runner away from the dam sluicing conduit. This achieves several things: elimination of the idling running turbines acting in the sluicing mode; reduces the fluid flow circulation path at each conduit; and also increases the transverse cross-sectional area of the conduit.

Because of the removable machine concept, which permits full displacement of the entire machine set from the water passageway defined through the dam body, the rated discharge flow can be increased through the conduit under only a 0.3 meter head, well above the 100% discharge capacity of each machine at full load. This sluicing procedure improvement permits full optimization of both ebb and flood tide cycles.

Another aim of the present invention relates to economics associated with the turbine and generator construction procedures. Until now, it must be recognized that manufacturers have never been confronted with the production of a large number of identical units of very large dimensions. Series of horizontal-axis bulb turbines have involved at the most 6 to 8 sets of the same design with the exception of the series of 24 machines engineered for the Rance tidal project, having 10,000 kW each or a total block of 240,000 kW. However, it is expected that in future tidal projects series of 100 identical machines will be constructed.

Considering a tidal project wherein caisson structures are adopted and made on the shore in dry conditions, such a caisson factory would have to include a workshop for assembly of the hydromotive sets and related supporting items such as stayrings, piers, access shafts, etc. In this manner simultaneous performance of civil engineering and mechanical engineering projects would certainly reduce schedule times to a great extent. It would also follow that a second shop would be provided for manufacturing large components such as stayrings, and the wicket gated mechanisms. Optimizing these important parts of the hydromotive machine will still be subordinate to the fundamental choices made concerning general provisions for the construction schedule of the whole tidal station, such as simultaneous performance of civil works and related mechanical works, general construction methods, choice of installation procedures, dismantling procedures for maintenance, types of access defined and the like.

The present invention allows for the full optimization of all of the above concerned items because the functional transformation concept permits the introduction of a complete separation design of the components defined by the concrete structure on one hand and the electromechanical components of the hydromotive sets on the other hand. In this manner hydromotive sets can be independently assembled at a factory, then transported to the barrage site and positioned adjacent the structural body of the dam for instant power production. Economics are realized twofold. First, because of the massive production of factory-assembled sets having similar components, and secondly, because of the simplification introduced into the dam structure itself.

A further object of the present invention is to provide an improved functionally transformable dam with tidal station producing an optimum hydraulic efficiency and including a reversible venturi-like shaped hydraulic conduit formed by a rotatable and linearly displaceable hydromotive assembly which is alternately cooperable with one or a set of two rectilinearly displaceable diffusers, positioned respectively at each side of the dam.

A preferred embodiment of the invention is shown in the accompanying drawings, in which.

Similar reference characters designate corresponding parts throughout the several figures of the drawings.

Figure 1:
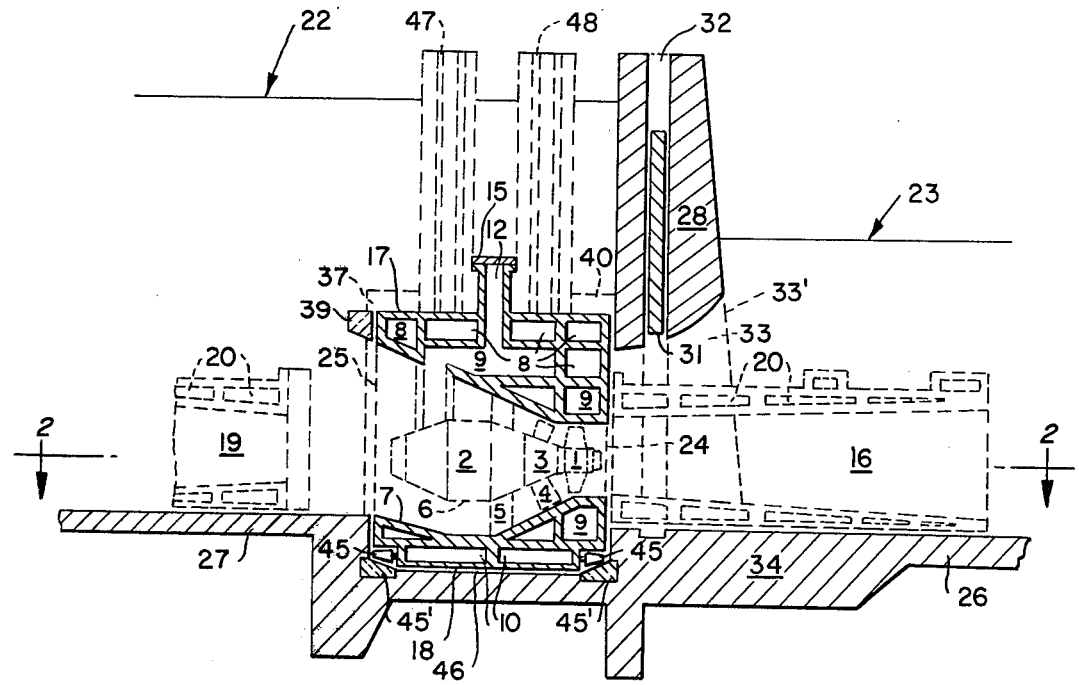
FIG. 1 is a vertical, longitudinal sectional view of a functionally trnasformable tidal station according to the present invention, as it appears in an energy direct generation mode during the ebb tidal cycle during the emptying of the basin.

Referring now to the drawings, the functionally transformable tidal power station according to the present invention will be seen to include a rotatable reversible energy generation unit comprising an electric generator 2 (optionally a pump-turbine) at one end axially adjacent an intermediate connecting shaft body 3. Also provided are the movable vane distributor 4 (optionally a fixed vane distributor) and fixed distributor 5 as is well known in the art.

Regulation of water flow passing the periphery of the capsule configuration of the electric or energy generator set 1, 2, 3 is achieved by means of the movable vanes of the distributor 4 combined with the movable blades of the turbine runner 1, if said runner is of the Kaplan type. If this distributor 4 is provided with fixed vanes then, regulation of the water flow is performed by means of a downstreamly positioned movable gate embodied within the draft tube structural body.

The generator 2 and its turbine runner 1 may be considered to be a unitary sub-assembly hermetically embodied by means of the surrounding capsule 6 in the generator side of the set. If a Harza type machine is selected then, generator 2 will obviously be engineered around the turbine runner 1, peripherally and outside of the water conduit 7 disposed adjacent the capsule 6.

An extending water flow circulation path surrounds the entire capsule-mounted generator 2 and is formed by the conduit 7 which serves as a wall defining the peripheral limits of the water flow circulation path and which extends between a large intake open end 25 and a more restricted and small outlet open end opening 24, as well known in venturi-type conduits.

In some circumstances, the stay ring arrangement of the fixed distributor 5, and the wicket gate mechanism of the movable distributor 4 will be constructed as only one sub-assembly and a single body component thus optimizing economics in scheduled construction.

The surrounding structural body 17 of the hydromotive assembly is provided with a plurality of internal chambers 8,9,10 serving respectively as buoyancy compartments, chambers for machinery utilization and chambers for purposes of ballasting.

As shown most clearly in FIG. 1 of the drawings, access means 12 having a cover 15 leads to the machine hall as defined by chambers 9 and also into the capsule 6.

The hydromotive assembly will be seen to be positioned for utilization adjacent the dam main body 28 while the structure of this body 28 in turn is suitably retained atop the underlying supporting slab 34 to which are attached the upstream slab 27 located on the basin side of the dam and the downstream slab 26 disposed on the sea side of the dam.

Figure 2:
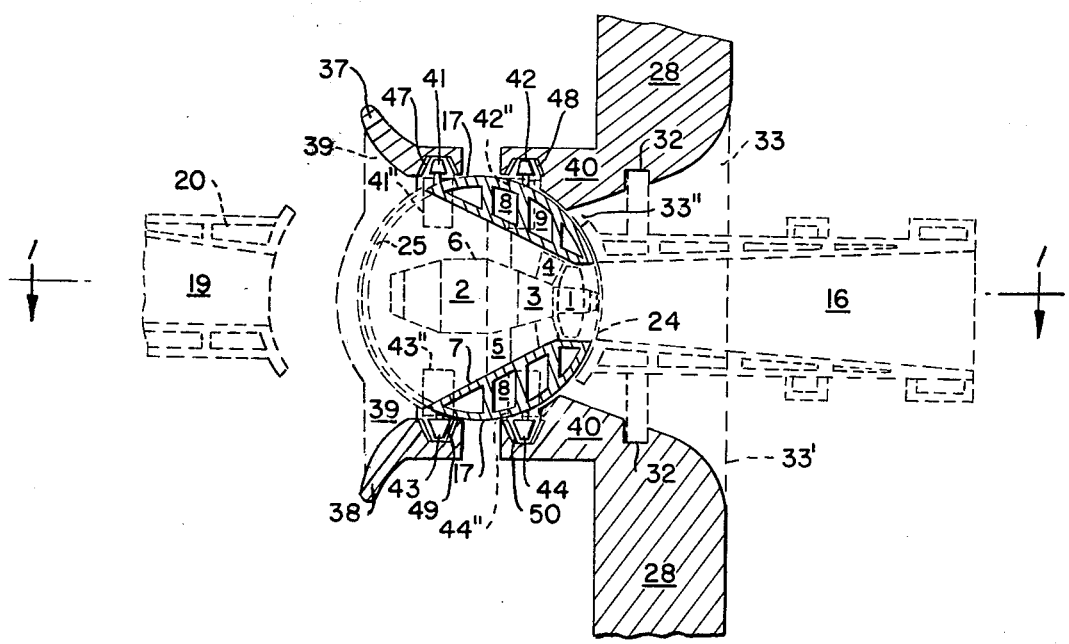
FIG. 2 is a horizontal sectional view of the structure shown in FIG. 1.
Figure 5:
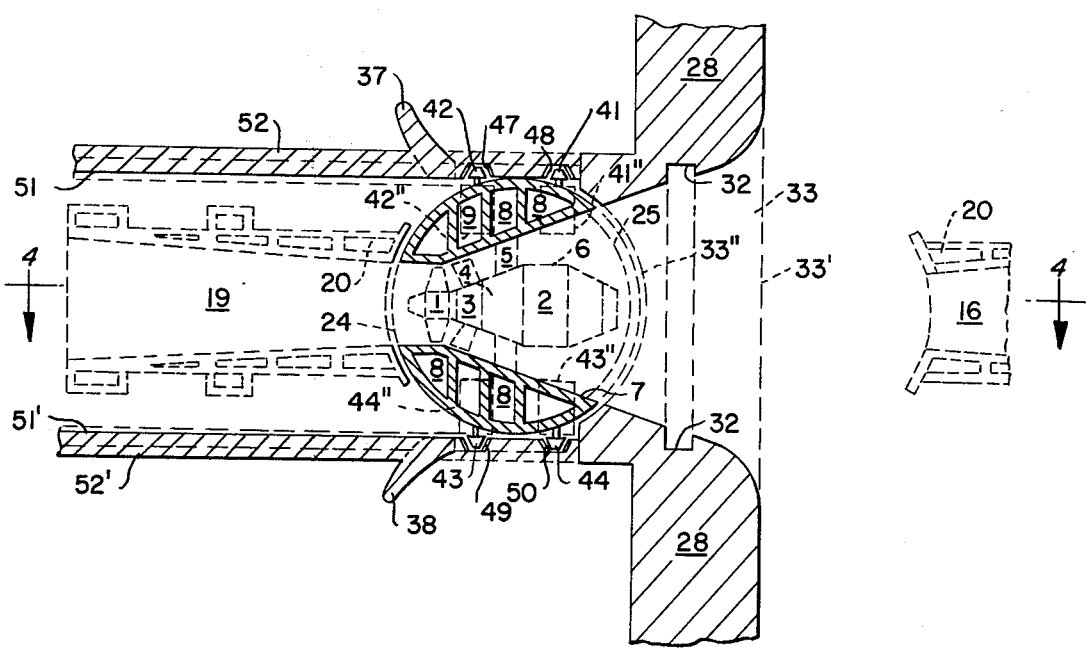
FIG. 5 is a horizontal sectional view of the structure shown in FIG. 4.

As seen in FIGS. 2 and 5 of the drawings, a sluiceway or fluid flow passageway 33 is provided through the dam main body 28 and serves as means for directing a flow of water therethrough. A restricted water path is provided by means also serving as a closure device for the sluiceway 33. This means preferably comprises a shiftable main gate 31 which may be vertically displaced within the oppositely disposed slots 32 in the main structural body 28.

The bottom 18 of the base of the hydromotive assembly body 17 is normally disposed atop the dam supporting slab 34 within a structural retaining basin or recess 46 which resists hydraulic thrusts upon the assembly body 17 when the station is performing in the sea-to-basin flow direction. The bottom 18 of the hydromotive assembly 17 is provided about its outer periphery with suitable co-planar means permitting a reversibility thereof such as a set of equi-spaced annular roller means 45 supported upon the mating annular surface 45' defined in the inner edge of the structural recess 46.

Figure 3:
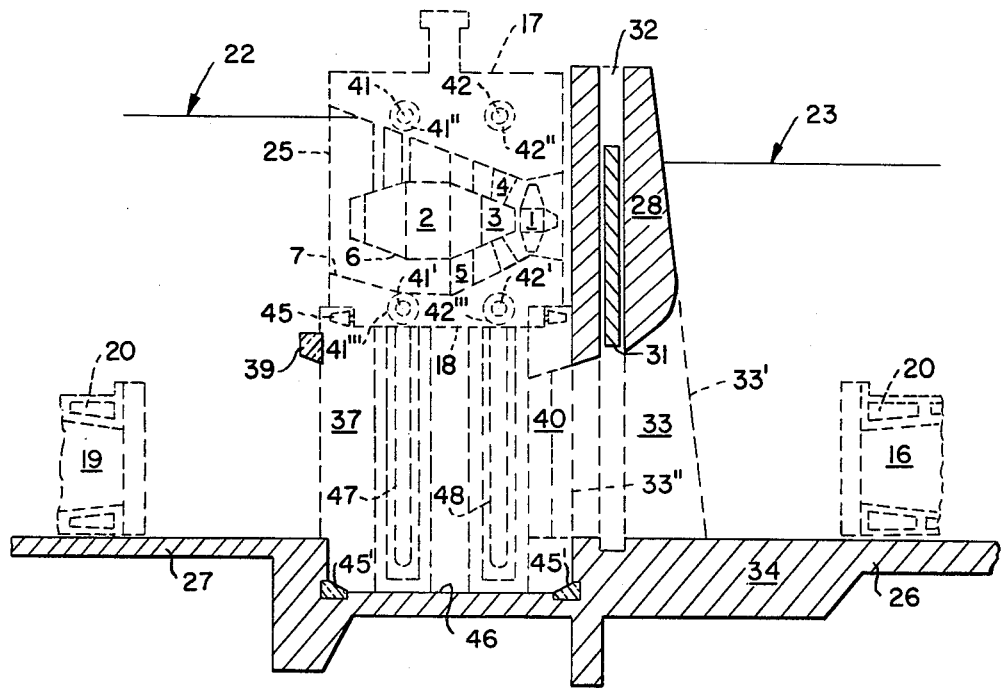
FIG. 3 is a vertical, longitudinal sectional view of a functionally transformable tidal station according to the present invention, as it appears when performing in an energy reversed generation mode during the flood cycle and the filling of the basin.
Figure 6:
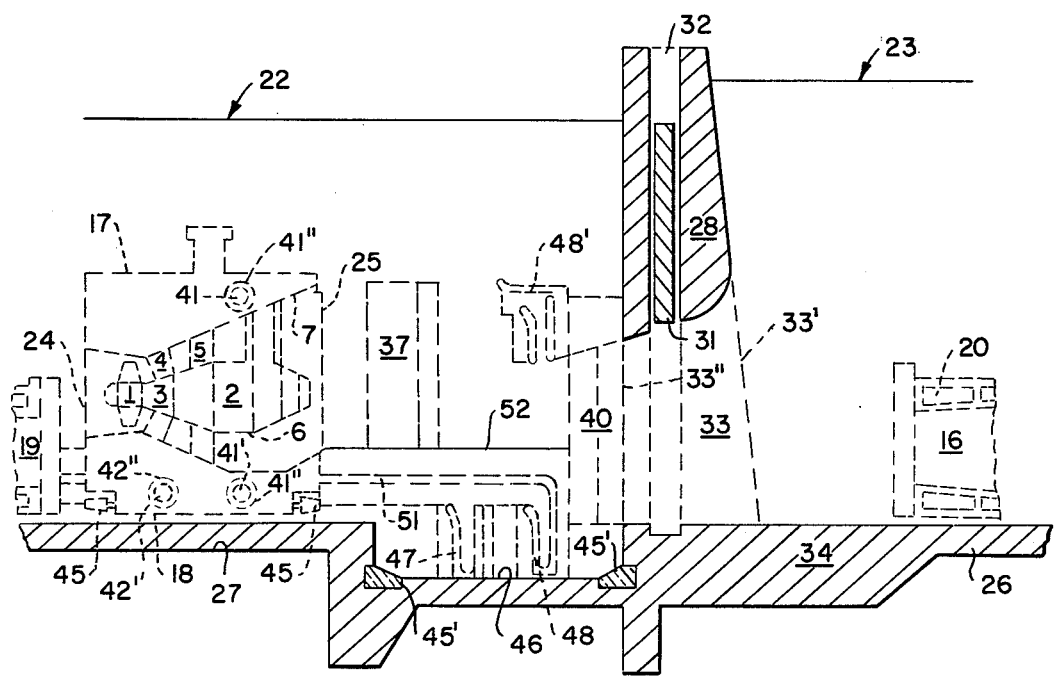
FIG. 6 is a vertical, longitudinal sectional view of a functionally transformed dam with a tidal station performing in a sluicing operating mode along the remaining phase of the flood tidal cycle, during the filling of the basin and with the hydromotive assembly body displaced away from the dam with a combined vertical and horizontal displacement.
Figure 4:
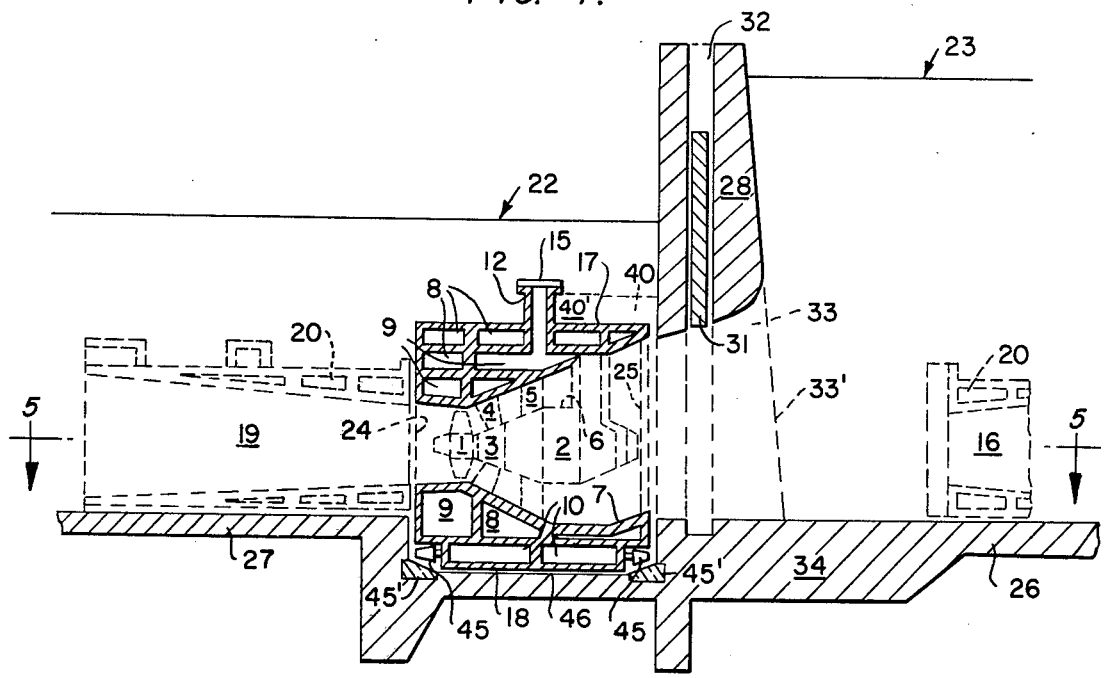
FIG. 4 is a vertical longitudinal sectional view similar to FIG. 1 but with the components as they appear in an alternate operating mode and cycle.

Appropriate well known means may be employed to rotate the hydromotive assembly about a substantially vertical axis passing through the center-line of the basin 46 so as to permit arcuate displacement of the assembly 17 in a 180° rotation between the two alternate positions shown in FIGS. 1-3 on the one hand and FIGS. 4-6 on the other hand.

Cooperating with the hydromotive assembly of the present invention are a first or sea-side diffuser 16 and a second or basin-side diffuser 19. Chambers 20 are provided for regulating buoyancy of both diffusers and roller means for displacement of the diffusers also are provided according to the teachings of my earlier U.S. Pat. No. 4,073,146 issued Feb. 14, 1978.

The diffusers 16,19 are rectilinearly displaceable relative the open end of the passageway 33 of the dam body and the open end 24 of the hydromotive assembly body 17 so as to combine to provide a smooth water flow circulation path when associated with conduit 7 of the assembly when either passing ebb tide flows or flood tide reversed flows.

As previously described, FIGS. 1, 2 and 3 illustrate the various components of the present invention as they appear when in the ebb tide cycle when the basin is emptying to the sea and the hydromotive set is in the direct generation mode. The diffusers 16,19 are represented in dotted lines in their respective positions during this cycle.

To initiate the ebb tide cycle the hydromotive assembly is rotated to the position shown in FIG. 1. When the gate 31 is moved to its lower position, the basin-side open end of the dam passageway 33 will be understood to be sealed by said assembly body and the dam body extensions 40-40 serve to promote a good closure between the dam water conveying means conduit and the juxtaposed face of the assembly 17. Then, upon raising of the gate 31, water flow will be controlled by movable wicket vanes of the distributor 4. With this arrangement no secondary conduit will be required through the main gate body 31.

When positioned as in FIGS. 1-2, the other, larger open end 25 of the hydromotive assembly 17 is facing basin-side, and this end is laterally bounded by two extension walls 37-38 which are suitably contoured on their upstream faces to assist in directing incoming water flow into the enlarged upstream, basin-side, open end 25 of the water flow circulation path through the interior of the hydromotive assembly.

When the movable vanes of the distributor 4 are closed and the gate 31 is raised to open the dam conduit 33, water pressure will assist in sealing the downstream face 24 of the assembly body 17 against the body 28 of the dam.

The station system is ready to start in the energy direct generation ebb tidal cycle powered mode by the selective rectilinear displacement of the diffusers into position as shown in FIGS. 1-2 of the drawings wherein it will be seen that the upstream end of the sea-side first diffuser 16 is moved juxtaposition the water conduit 7 open end 24 of said assembly, while the second, basin-side diffuser 19 is moved away from the upstream open end 25 of the hydromotive assembly. In this tidal ebb cycle generation mode, during the emptying of the basin, the basin-side water level 22 and the sea-side water level 23 may appear as illustrated in FIG. 1 of the drawings and accordingly, it will be understood that the resultant water hydraulic head will produce a flow of water into the upstream open end 25 of the hydromotive assembly, through the water flow circulation path defined by the interior peripheral wall 7 thereof, thence through the turbine runner 1 and through the restricted downstream open end 24 of the hydromotive assembly before passing into the first sea-side diffuser 16.

Concurrently with the above described water flow path produced after the opening of movable vanes 4 of distributor, the turbine runner 1 of the energy generation unit 2 will be actuated to operate the generator thereof.

This ebb tidal cycle is continued until the positive hydraulic head is substantially reduced, and any continued running of the turbine would not be technically feasible in view of failure to maintain a satisfactory efficiency level. At such point, gate 31 is lowered to close the conduit passageway 33 defined in dam main body 28 and the assembly body 17 is linearly displaced either vertically, and/or horizontally, to open the gap defined by the water passageway 33 in the basin-side of same.

The next sequence is shown in FIG. 3 of the drawings in which it is seen that assembly body 17 is vertically displaced until floatation is achieved above the water level 22 of the basin. The sluicing procedure cycle is then ready to start. In this functional transformation the water passageway 33 acts now as a sluice passageway after raising of the gate 31 and the basin then discharges excess water until levels 22 and 23 are nearly equalized. Thereafter gate 31 is closed again and the ebb tidal cycle ends.

The above referenced displacement of the assembly body 17 may be performed in a substantially vertical mode as seen in FIG. 3 or, in a combined vertical-horizontal mode as seen in FIG. 6. In either case, roller means 41, 42, 43, 44 and 41', 42', 43' 44' cooperating with running surfaces or channel guides 47, 48, 49, 50 are mounted at outer ends of retractable bodies which may be selectively withdrawn into recesses 41'', 42'', 43'', and 44'' and 41''', 42''', 43''', 44''' defined on the assembly body 17 periphery.

When the assembly body 17 is rotated, the roller means are in the retracted position within the confines of the recesses 41'', 42'', 43''44'' and they are outwardly positioned between guide surfaces 47, 48, 49, 50 for guiding the vertical displacements of the assembly as seen in FIGS. 2 and 3. These upward motions are induced by filling the chambers 8 with gas to introduce a floatation status to the body 17 within the water body 22. Downward motions are induced by filling the chambers 8 with fluid to inroduce a reversed, sinking status on body 17 until it rests within the basin or pit 46 and is supported by roller means 45.

In FIGS. 5 and 6, a combined vertical-horizontal linear displacement of the body 17 is shown. This combined sequence requires that the lower plurality of roller means 41', 42', 43'44' be outwardly displaced from their recesses 41'', 42'', 43'', 44'' within the assembly body 17 to insure engagement within the guide or running surfaces 47, 48, 49, 50 which are vertically disposed and thus guarantee upward and downward displacement of the assembly 17. This displacememt is more restricted than the much longer vertical guiding means shown in FIGS. 2 and 3.

In the horizontal sequence the extended rollers 41' through 44' are engaged within horizontal guide means or running surfaces 51, 51' defined on top of the walls 52,52' as shown in FIGS. 5 and 6. Alternately, the surfaces 51,51' may be slanted or inclined. To accomplish this latter displacement, a selected upward force is disposed on the body 17 so as to permit contacting of the motorized rollers 41', 42', 43', 44' on the lower faces of the running surfaces 51,51' thereby allowing said horizontal or slantingly directed linear displacement within the water body 22.

The flood tidal cycle begins when the sea-side water level 23 raises over the basin water level 22 thereby leading to a progressively developing hydraulic head. This is the reversed, indirect generation flood tide cycle and permits the flooding of the basin 22 from the higher sea-side level 23, as shown in FIGS. 4, 5 and 6. To start generation, the assembly 17 must be positioned again adjacent the main body 28 of the dam and into the structural pit 46 and the assembly must be rotated. For this purpose the rollers 41', 42', 43', 44' are retracted into their recesses 41"+ so as to free body 17 from the guiding surfaces 47, 48, 49, 50. Then, rotation of the assembly 17 is feasible and rollers 45 are motorized to move over the annular running surface 45' in a 180° displacement so as to position the large open end 25 in combination with the dam passageway 33. Then, the rollers 41', 42', 43', 44' are extended once again to aid in fixing said body 17 by resisting free rotational displacement of same.

The chambers 8 are fully filled with fluid so that the body 17 is fixed against the walls of pit 46. Fixing against the lateral walls of the pit can be performed by any suitable means, such as dilatable annular bodies (not shown) and the like. Also, sealing of the open end 25 against the dam passageway 33 open end is performed by means of suitable means well known in the art, and not shown in the drawings.

Once a suitable hydraulic head has developed between the upper sea level 23 and the lower basin level 22, then gate 31 is raised and conduit 33 is free for water passage. Movable vanes of the distributor 4 are opened, the generator is synchronized, and the flood tide cycle begins in the indirect generation mode with reversed flow direction.

It must be noted also that the diffuser 16 has been previously displaced away from dam body 28 while the second diffuser 19 has been rectilinearly displaced toward the body 17 of the assembly with its smaller open end juxtaposed the smaller opening 24 of the hydromotive assembly so as to provide a smooth water flow path.

With the foregoing achieved, the flood tide energy generation cycle may take place as hydraulic head develops between upper sea level 23 and lower basin level 22.

As stated, the cycle starts by raising gate 31, opening distributor 4 and synchronizing generator 2. Then, water is returned to the basin from the sea through the hydromotive assembly conduit 7, thence through the second diffuser 19 and into the body of water behind the dam. After a certain time sea level 23 stabilizes and hydraulic head begins to reduce its numerical parametric value. When this numerical parameter does not permit satisfactory efficient power generation then gate 31 is closed and indirect generation finishes.

At this point the sluicing sequence must be prepared by the functional transformation of the dam. This is achieved by linearly displacing the assembly body 17 as already seen and after the diffuser body 19 has been shifted away from the assembly open end 24. The gate 31 is then raised and the sluicing period begins once again until both sea level 23 and basin level 22 are nearly fully equalized. Then the water passageway 33 is closed again by lowering the gate 31 into the conduit and the next cycle begins once again.

Some remarks must be introduced to better explain relative performance of various components. The structural retaining pit or recess 46 acts also as a stilling basin which traps silting particles carried by waters. Thereafter, suitable dredging methods are followed so as to clean the basin before the assembly body 17 is disposed in it.

If the vertical linear sequence displacement is chosen then a structural beam 39 (FIGS. 1,3) supported by the extension walls 37,38 aids in assisting the assembly body 17 to resist horizontal hydraulic thrusts produced by incoming waters in the basin.

Other well known mechanical means could be engineered for purposes of inducing the described rotatable displacements such as conical gear devices and said linear displacement may be accomplished by means such as gears combined with toothed bars.

The advantage of the horizontal displacement should become more obvious as it allows instant lateral displacement of the assembly 17 in order to readily remove it from the dam, for purposes of installation at another dam opening or for allowing replacement by another hydromotive assembly.

The disclosed concept for vertical displacement may be practiced in other types of installations to induce a more deep setting of an assembly body.

Optionally, a more complete arrangement can be designed by replacing the energy generation set by an energy transformation set having a generator-motor combined with a pump-turbine runner for purposes of pumping waters from the depleted basin side into the upper sea levels, or in reverse, from the lower sea levels into the basin side, by taking electric energy from other sources. This arrangement is more costly and is not detailed in this patent application in very full detail. A check valve could be included in the diffuser bodies 16, 19 for avoiding reversing of water flows when a power load rejection occurs in the pumping mode.

From the foregoing it will be seen that an improved tidal station of the functionally transformable type is provided comprising a symmetrical arrangement including 180° reversible hydromotive assembly alternately cooperating with two rectilinearly displaceable diffusers to realize a maximum hydraulic efficiency in either a direct generation mode in the ebb tidal cycle during the emptying of the basin or an indirect generation mode in the flood tidal cycle during the filling of the basin. Unique means are provided by means of which the emptying process and filling process are assisted by the transformability concept which permits performance in a sluicing manner of the functional dam body once the hydromotive assembly is transformed.

I claim:

1. In a fluid storing dam including a main structural body having means for directing a fluidic flow therethrough and auxiliary structural bodies having means for directing running structures therealong and therearound, the improvement comprising one or more hydromotive assemblies positioned against said main dam structural body, each said hydromotive assembly including a conduit having a peripheral wall defining a fluidic flow circulation path, a hydromotive power unit disposed in functional combination with said fluidic flow circulation path defined by said conduit, said assembly conduit having a first open end and a second open end for discharging fluidic flows entering said first open end, both said first and second open ends configured to be alternatively positioned against an open end of said dam fluidic flow directing means and means on said hydromotive assembly mounting same in functional combination upon said main and auxiliary structural bodies of said dam to allow rotatable displacement of said hydromotive assembly between alternate positions, and alternatively to allow rectilinear displacement of same between linearly spaced positions.

2. A fluid storing dam according to claim 1 wherein, one said open end of said hydromotive assembly is disposed in functional combination against said dam fluidic flow directing means to allow said hydromotive power unit to perform in an energy generation mode along a portion of the ebb tidal cycle during the emptying of the basin while, after rotation of said assembly, the remaining open end of said conduit is disposed also in functional combination against said dam fluidic flow directing means to allow said hydromotive power unit to perform in an energy generation mode along the portion of the flood tidal cycle during the filling of the basin.

3. A fluid storing dam according to claim 1 wherein, said mounting means defines two substantially spaced alternate positions for said linearly displaceable hydromotive assembly, said hydromotive assembly when in a first one of said positions having said open end functionally juxtaposed said dam fluidic flow directing means for purposes of energy generation and said assembly in the second of said positions having said open end fully removed from juxtaposition said dam fluidic flow directing means for purposes of fluidic sluicing procedures, whereby said dam fluidic flow directing means is functionally transformed as a sluiceway conduit after a concerned gate disposed within the body of the dam is raised to open said conduit, alternatively during the remaining portions of both ebb and flood tidal cycles.

4. A fluid storing dam according to claim 1 wherein, said hydromotive assembly has roller means controllably ejectable outwardly of its structural body to be combined with guide means defined within said dam auxiliary bodies for purposes of assisting therealong said rectilinear displacements and roller means combined with annularly defined guide means in said dam auxiliary bodies for purposes of assisting said rotatable displacement.

5. A fluid storing dam according to claim 4 wherein, said controllably ejectable and retractable roller means assisting in rectilinear displacement of the assembly body are inwardly disposed within the structural body of same for purposes of allowing said rotatable displacement.

6. A fluid storing dam according to claim 1, including a diffuser mounted for substantially rectilinear displacement along an axis passing through said dam fluidic flow directing means whereby, following positioning of one of said assembly conduit open ends in functional combination against said dam fluidic flow directing means, said diffuser may be displaced toward said assembly body open end to provide a smooth flow circulation path through said respectively combined hydromotive assembly and diffuser, when performing in the energy generation mode.

7. A fluid storing dam according to claim 1 including, a set of two diffusers mounted for substantially rectilinear displacement along a respective axis passing through said dam fluidic flow directing means, a first one of said diffusers located on the sea-side fluid body and the second one on the basin-side fluid body whereby, following positioning of one said hydromotive assembly conduit open ends against said dam fluidic flow directing means, a selected one of said diffusers may be displaced toward said assembly conduit open end to provide a smooth continuous fluidic flow circulation path through said respectively functionally combined hydromotive assembly and diffuser, when performing in the energy generation mode, with said remaining diffuser being displaced away from said main dam body so as not to disturb said smooth fluidic flow.

8. A fluid storing dam according to claim 7 wherein, said hydromotive assembly conduit and first diffuser are functionally combined to perform in the energy generation mode along a portion of the ebb tidal cycle while, after rectilinear displacement of said first diffuser away from said assembly body and rotation of said assembly, said assembly conduit is functionally combined with said second diffuser to perform also in the energy generation mode along a portion of the flood tidal reversed cycle.

9. A fluid storing dam according to claim 1 including, two diffusers mounted for rectilinear displacement along a respective axis passing through said dam fluidic flow directing means, a first one of said diffusers located on the sea-side fluidic body and the second one of said diffusers located on the basin side fluidic body whereby, following positioning of one said hydromotive assembly conduit open ends in functional combination against said dam fluidic flow directing means, a selected one of said diffusers may be displaced toward said main dam structural body to provide a smooth continuous fluidic flow circulation path through said respectively functionally combined hydromotive assembly, dam fluidic flow circulation path directing means, and diffuser with said remaining diffuser rectilinearly displaced away from said main dam structural body so as not to disturb said smooth fluidic flow.

10. A fluid storing dam according to claim 9 wherein, said dam fluidic flow circulation path directing means is defined as a secondary open end within the body of a main gate which controls fluidic flows through said dam fluidic flow directing means, and having a secondary controllably-operable gate within the body of said main gate structural body so as to control fluidic flows passing through said secondary open end.

11. A fluid storing dam according to claim 9 wherein, said hydromotive assembly, dam fluidic flow directing means, and first diffuser are all functionally combined to perform in the energy generation mode along a portion of the ebb tidal cycle whereby, after rectilinear displacement of said first diffuser away from the dam body and rotation of said assembly, said assembly is functionally combined with said second diffuser to perform also in the energy generation mode along a portion of the flood tidal cycle.

12. In a fluid storing dam including a main structural body having means for directing a fluidic flow therethrough and auxiliary structural bodies having means for directing running structures therealong and therearound the improvement comprising, one or more hydromotive assemblies positioned against said main dam structural body, each said hydromotive assembly including a conduit having a peripheral wall defining a fluidic flow circulation path, a hydromotive power unit designed to act either in an energy generation mode or, alternatively, in an energy accumulation pumping mode and being disposed in functional combination with said fluidic flow circulation path defined by said conduit, said power unit adapted to be actuated by motive fluidic flows within said conduit or to activate fluidic flows, alternatively, within it, said assembly conduit having a first open end and a second open end for discharging fluidic flows entering said first open end when performing in the energy generation mode, both said first and second open ends configured to be alternatively positioned against an open end of said dam fluidic flow directing means, and means on said hydromotive assembly mounting same in functional combination upon said main and auxiliary structural bodies of said dam to allow rotatable displacement of said hydromotive assembly between alternate positions, and to alternatively, allow rectilinear displacement of same between linearly spaced positions.

* * * * *